(12) United States Patent
Kneller et al.

(10) Patent No.: US 9,922,764 B2
(45) Date of Patent: Mar. 20, 2018

(54) EMBEDDED MAGNETIC COMPONENT TRANSFORMER

(71) Applicant: Murata Manufacturing Co., Ltd., Nagaokakyo-shi, Kyoto-fu (JP)

(72) Inventors: Quinn Kneller, Milton Keynes (GB); Jing Wang, Milton Keynes (GB); Lee Francis, Milton Keynes (GB)

(73) Assignee: MURATA MANUFACTURING CO., LTD., Kyoto (JP)

( * ) Notice: Subject to any disclaimer, the term of this patent is extended or adjusted under 35 U.S.C. 154(b) by 211 days.

(21) Appl. No.: 15/019,240

(22) Filed: Feb. 9, 2016

(65) Prior Publication Data

US 2016/0254088 A1 Sep. 1, 2016

(30) Foreign Application Priority Data

Feb. 26, 2015 (GB) .................................. 1503274.1

(51) Int. Cl.
| | |
|---|---|
| H01H 27/00 | (2006.01) |
| H01F 27/40 | (2006.01) |
| H01F 27/28 | (2006.01) |
| H01F 27/29 | (2006.01) |
| H02M 3/337 | (2006.01) |
| H02M 3/338 | (2006.01) |

(52) U.S. Cl.
CPC ......... *H01F 27/40* (2013.01); *H01F 27/2804* (2013.01); *H01F 27/29* (2013.01); *H01F 2027/2819* (2013.01); *H02M 3/337* (2013.01); *H02M 3/338* (2013.01)

(58) Field of Classification Search
CPC ..................................... H01F 27/40

USPC ......................................................... 361/268
See application file for complete search history.

(56) References Cited

U.S. PATENT DOCUMENTS

| | | | |
|---|---|---|---|
| 6,445,271 B1 * | 9/2002 | Johnson | H01F 17/0033 257/531 |
| 7,196,607 B2 * | 3/2007 | Pleskach | H01F 17/0033 257/E23.062 |

(Continued)

OTHER PUBLICATIONS

Kneller et al.; "Embedded Magnetic Component Device"; U.S. Appl. No. 14/825,332, filed Aug. 13, 2015.

(Continued)

*Primary Examiner* — Stephen W Jackson
(74) *Attorney, Agent, or Firm* — Keating & Bennett, LLP

(57) ABSTRACT

An embedded magnetic component transformer includes first, second, and auxiliary electrical windings in an insulating substrate including conductive vias joined together by conductive traces. The first electrical windings are divided by a tap terminal into first and second winding portions, which are interleaved with one another and energized by separate transistors. Heat generated by the first and second winding portions is transferred more equally to the separate transistors. Equal or substantially equal path lengths between each of the transistors and the first electrical windings improve flux balance allowing the transistors to conduct for equal or substantially equal times during a switching cycle. Thus, the switching cycle of the embedded transformer is more symmetric with respect to each of the transistors and winding portions, improving the electrical characteristics of the transformer.

19 Claims, 9 Drawing Sheets

(56) References Cited

U.S. PATENT DOCUMENTS

| | | | | |
|---|---|---|---|---|
| 7,513,031 | B2* | 4/2009 | Pleskach | H01F 17/0033 156/250 |
| 7,671,716 | B2* | 3/2010 | Chen | H01F 17/0033 336/200 |
| 8,350,657 | B2* | 1/2013 | deRochemont | B82Y 30/00 336/200 |
| 8,466,769 | B2* | 6/2013 | Dalmia | H01F 17/0006 336/200 |
| 8,823,480 | B2* | 9/2014 | Dalmia | H01F 5/003 336/182 |
| 8,860,543 | B2* | 10/2014 | Schaffer | H01F 17/0033 336/200 |
| 9,312,059 | B2* | 4/2016 | Dinh | H01F 17/06 |

OTHER PUBLICATIONS

Parish et al.; "Embedded Magnetic Component Device"; U.S. Appl. No. 14/825,327, filed Aug. 13, 2015.
Francis; "Embedded Magnetic Component Device"; U.S. Appl. No. 14/883,854, filed Oct. 15, 2015.
Wang et al.; "Embedded Magnetic Component Transformer Device"; U.S. Appl. No. 14/883,855, filed Oct. 15, 2015.
Kneller; "Embedded Magnetic Component Transformer Device"; U.S. Appl. No. 14/883,859, filed Oct. 15, 2015.
Kneller; "Embedded Magnetic Component Transformer Device"; U.S. Appl. No. 14/883,863, filed Oct. 15, 2015.
Wang et al.; "Embedded Magnetic Component Transformer Device"; U.S. Appl. No. 14/883,866, filed Oct. 15, 2015.
Parish et al.; "Embedded Magnetic Component Device"; U.S. Appl. No. 15/054,412, filed Feb. 26, 2016.
Lloyd; "Embedded Magnetic Component"; U.S. Appl. No. 15/049,414, filed Feb. 22, 2016.
Harber; "Embedded Magnetic Component Device"; U.S. Appl. No. 15/050,536, filed Feb. 23, 2016.
Kneller et al., "Multi-Tap Winding Design for Embadded Transformer", U.S. Appl. No. 15/498,765, filed Apr. 27, 2017.
Francis, "Power Electronics Device With Improved Isolation Performance", U.S. Appl. No. 15/498,769, filed Apr. 27, 2017.
Kneller et al., "DC-DC Converter Device", U.S. Appl. No. 15/703,086, filed Sep. 13, 2017.

* cited by examiner

EMBEDDED MAGNETIC COMPONENT TRANSFORMER

BACKGROUND OF THE INVENTION

1. Field of the Invention

The present invention relates to a device including an embedded magnetic component transformer, and in particular, to an embedded magnetic component transformer with an improved winding design that improves an electrical performance of the transformer.

2. Description of the Related Art

It is known, for example, in US 2011/0108317 A1, to provide low profile transformers and inductors in which the magnetic components are embedded in a cavity formed in a resin substrate, and the necessary input and output electrical connections for the transformer or inductor are formed on the substrate surface. A printed circuit board (PCB) for a power supply device can then be formed by adding layers of solder resist and copper plating to the top and/or bottom surfaces of the substrate. The necessary electronic components for the device may then be surface mounted on the PCB.

Compared to conventional transformers, an embedded design allows a significantly thinner and more compact device to be built. This is desirable because typically the space available for mounting the transformer device onto a PCB, for example, a motherboard of an electronics device, will be very limited. A transformer component with a smaller footprint will therefore enable more components to be mounted onto the PCB, or enable the overall size of the PCB and therefore the entire device to be reduced.

When reducing the size of the transformer device, the adjacent turns of a transformer winding are likely to be provided more closely together, and the gap between separate windings provided on the transformer core is also likely to be reduced. As the windings heat up during use, these reduced separation distances can lead to the generation of hot-spots within the device, which can affect the performance of surrounding electrical components. In particular, those electrical components which control the transformer may be adversely affected by the hot-spots, with the result that the performance of the embedded transformer device is compromised. The need to reduce the overall transformer size tends to bring these electrical components into closer proximity with the transformer coils. This makes the electrical components more vulnerable to the coil heating and further compounds the problem. In addition, changing the positions of the electrical components can lead to a reduction in electrical isolation between the input and output sides of the transformer, increasing the risk of electrical arcing.

The undesirable heating effect on the electrical components positioned on the transformer windings can be mitigated by providing heat sinks, or making the circuit board larger to allow more space to be provided between the transformer and the components. It is also possible to correct for the effect of the heating electrically, for example, by increasing the capacitance of the transformer device or including additional stages of electrical circuitry. However, all of these possible solutions require an increase in the size of the embedded transformer device, which is often impossible due to tight restrictions on space.

In addition, differences in electrical path length between the transformer coil and the electrical components controlling the transformer can further degrade the performance of an embedded transformer device, particularly when combined with the heating effect discussed above.

Thus, the inventors of the invention described and claimed in this application have discovered that it would be desirable to provide an embedded transformer device having an improved electrical performance without requiring an increase in size, and a method for manufacturing such a device.

SUMMARY OF THE INVENTION

In a first aspect of various preferred embodiments of the present invention a power electronics device includes an embedded transformer, and first and second transistors, wherein the embedded transformer includes an insulating substrate including a first side and a second side opposite the first side, and including a cavity therein, the cavity including an inner periphery and an outer periphery; a magnetic core housed in the cavity including a first section and a second section; a first electrical winding, passing through the insulating substrate and disposed around the first section of the magnetic core; a second electrical winding, passing through the insulating substrate and disposed around the second section of the magnetic core; each of the first and second electrical windings including upper conductive traces disposed on the first side of the insulating substrate; lower conductive traces disposed on the second side of the insulating substrate; conductive connectors passing through the insulating substrate adjacent the inner periphery of the magnetic core, the inner conductive connectors respectively defining electrical connections between respective upper conductive traces and respective lower conductive traces; and outer conductive connectors passing through the insulating substrate adjacent the outer periphery of the magnetic core, the outer conductive connectors respectively defining electrical connections between respective upper conductive traces and respective lower conductive traces; the upper and lower conductive traces and inner and outer conductive connectors defining respective turns of the first and second electrical windings; wherein the first electrical winding includes a first end terminal and a second end terminal; a tap terminal; a first winding portion between the first end terminal and the tap terminal; a second winding portion between the second end terminal and the tap terminal; the first transistor energizes the first winding portion; the second transistor energize the second winding portion; the first and second winding portions are energized alternately; and at least one of the turns of the first winding portion is interleaved between turns of the second winding portion.

All of the turns of the first winding portion may be interleaved with turns of the second winding portion.

The first winding portion may include a same number of turns as the second winding portion.

The tap terminal may be located on an electrical path that is equidistant or substantially equidistant from each of the first end terminal and the second end terminal.

The first transistor may be electrically connected to the first end terminal via a first conducting portion; the second transistor may be electrically connected to the second end terminal via a second conducting portion; and the device may further include a first electrical path extending from the first transistor, via the first conducting portion, the first end terminal, and the first winding portion, to the tap terminal; and a second electrical path extending from the second transistor, via the second conducting portion, the second end terminal, and the second winding portion, to the tap terminal; the lengths of the first and second electrical paths are equal or substantially equal.

The first end terminal may be located at a first angular position around the outer periphery of the cavity; the second end terminal may be located at a second angular position around the outer periphery of the cavity; and the tap terminal may be located at an angular position between the first and second angular positions.

The first end terminal may be located at a first angular position around the outer periphery of the cavity; the tap terminal may be located at a second angular position around the outer periphery of the cavity; and the second end terminal may be located at an angular position between the first and second angular positions.

One of the first or second electrical windings of the embedded transformer may have fewer turns than the other, and the upper and lower conductive traces of the one electrical winding may be wider than the upper and lower conductive traces of the other electrical winding.

The device may further include an additional tap terminal located on the second electrical winding; wherein the second electrical winding includes a third winding portion between a first end terminal of the second electrical winding and the tap terminal; a fourth winding portion between a second end terminal of the second electrical winding and the tap terminal.

At least one of the turns of the third winding portion may be interleaved between turns of the fourth winding portion.

All of the turns of the third winding portion may be interleaved with turns of the fourth winding portion.

The third winding portion may include a same number of turns as the fourth winding portion.

The additional tap terminal may be located on an electrical path that is equidistant or substantially equidistant from each of the first end terminal of the second electrical winding and the second end terminal of the second electrical winding.

The embedded transformer may further include an auxiliary electrical winding operable to switch at least one of the transistors, the auxiliary electrical winding passing through the insulating substrate and disposed around the magnetic core; the auxiliary electrical winding including upper conductive traces disposed on the first side of the insulating substrate; lower conductive traces disposed on the second side of the insulating substrate; inner conductive connectors passing through the insulating substrate adjacent the inner periphery of the magnetic core, the inner conductive connectors respectively defining electrical connections between respective upper conductive traces and respective lower conductive traces; and outer conductive connectors passing through the insulating substrate adjacent the outer periphery of the magnetic core, the outer conductive connectors respectively defining electrical connections between respective upper conductive traces and respective lower conductive traces; the upper and lower conductive traces and inner and outer conductive connectors defining respective turns of the auxiliary electrical winding.

The first and second transistors may be positioned such that a heat flow from the windings of the embedded transformer to the first transistor is equal or substantially equal to that from the windings of the embedded transformer to the second transistor.

The first and second transistors may be positioned such that a leakage inductance between the first transistor and the windings of the embedded transformer is equal or substantially equal to that between the second transistor and the windings of the embedded transformer.

A push-pull type power transformer including the device may be provided.

The power transformer may further include a Royer circuit on the input side.

The power transformer may further include a synchronized rectifier on the output side.

In a second aspect of various preferred embodiments of the present invention a power electronics device includes an embedded transformer, and first and second transistors, wherein the embedded transformer includes an insulating substrate including a first side and a second side opposite the first side, and having a cavity therein, the cavity including an inner periphery and an outer periphery; a magnetic core housed in the cavity including a first section and a second section; a first electrical winding, passing through the insulating substrate and disposed around the first section of the magnetic core; a second electrical winding, passing through the insulating substrate and disposed around the second section of the magnetic core; each of the first and second electrical windings including upper conductive traces disposed on the first side of the insulating substrate; lower conductive traces disposed on the second side of the insulating substrate; inner conductive connectors passing through the insulating substrate adjacent the inner periphery of the magnetic core, the inner conductive connectors respectively defining electrical connections between respective upper conductive traces and respective lower conductive traces; and outer conductive connectors passing through the insulating substrate adjacent the outer periphery of the magnetic core, the outer conductive connectors respectively defining electrical connections between respective upper conductive traces and respective lower conductive traces; the upper and lower conductive traces and inner and outer conductive connectors defining respective turns of the first and second electrical windings; wherein the first electrical winding includes: a first end terminal and a second end terminal; a tap terminal; a first winding portion between the first end terminal and the tap terminal; a second winding portion between the second end terminal and the tap terminal; the first transistor energizes the first winding portion; the second transistor energizes the second winding portion; the first and second winding portions are energized alternately; the first and second transistors overlap the first electrical winding when viewed in a direction perpendicular or substantially perpendicular to the first side of the insulating substrate, an overlapping area of the first transistor and the first electrical winding is bigger than an overlapping area of the second transistor and the first electrical winding, and the first transistor overlaps both the first and second winding portions.

The second transistor may overlap both of the first and second winding portions.

Other preferred embodiments of the present invention also provide corresponding methods of manufacture.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 2B illustrates locations for the transistors used to energize the transformer windings of FIG. 2a;

DETAILED DESCRIPTION OF THE PREFERRED EMBODIMENTS

Example preferred embodiments of the present invention are embedded magnetic component transformers including electrical windings disposed around a magnetic core embedded in an insulating substrate, together with transistors to energize the windings. The embedded magnetic component transformer may advantageously be used in switching power electronic devices, such as a self-oscillating push-pull (Royer) circuit, and may be used to convert a DC input voltage to a DC output voltage. A preferred embodiment of the present invention will be discussed in relation to FIG. 1, in order to illustrate the general application of the embedded transformer to power electronics. The details of the transformer itself will be discussed in relation to subsequent preferred embodiments of the present invention.

Figure 1:
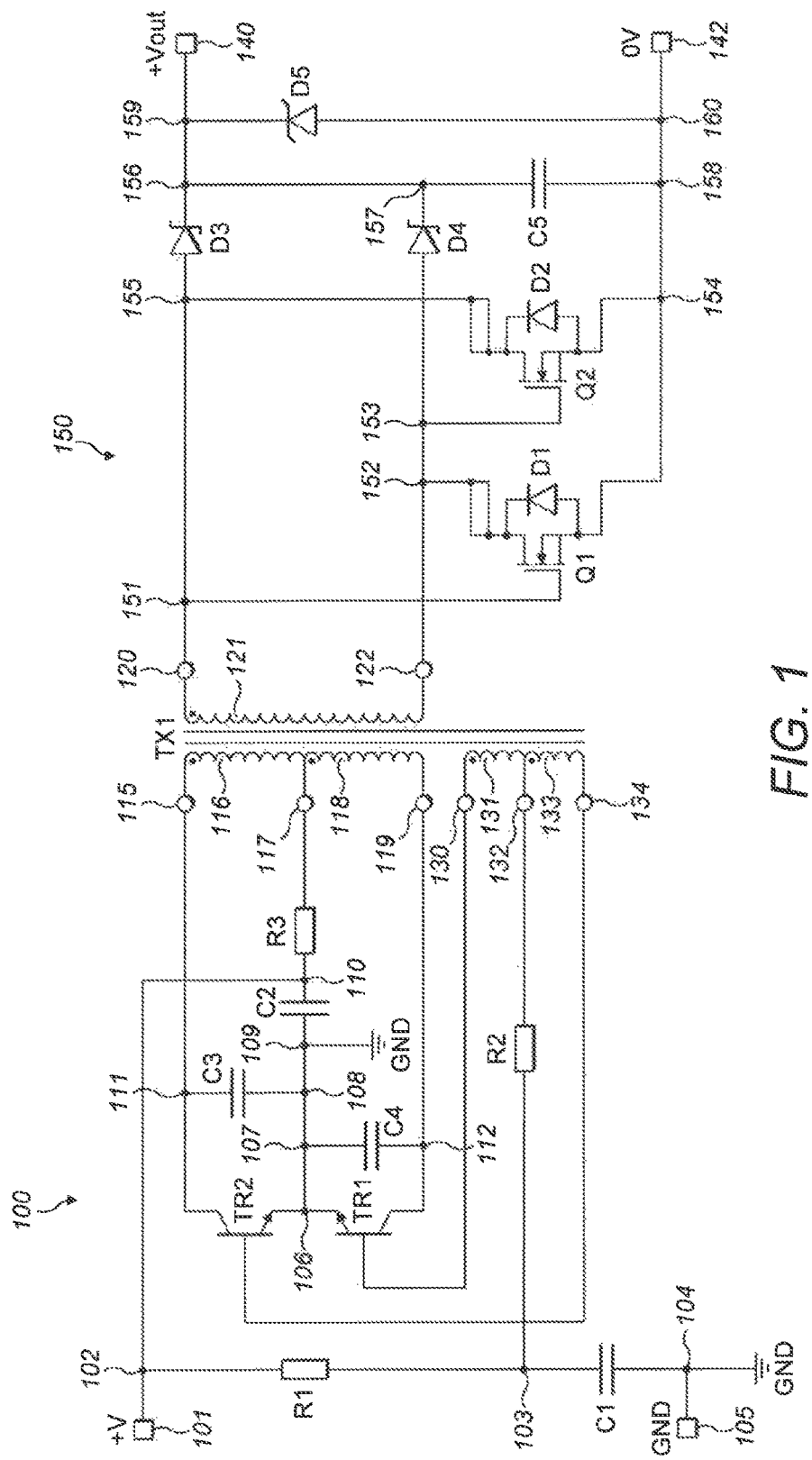
FIG. 1 illustrates a preferred embodiment of the present invention where an embedded transformer is include in a self-oscillating push-pull circuit.

FIG. 1 is a circuit diagram including an embedded transformer TX1, a Royer circuit 100 located on the input side of the transformer TX1, and a synchronized rectifier circuit 150 located on the output side of the transformer TX1.

Royer circuit 100 takes a DC input between a +V input terminal 101 and GND input terminal 105, with the GND terminal being held at a ground potential. A resistor R1 and capacitor C1 are connected in series across the input terminals 101, 105. Resistor R1 is connected between nodes 102 and 103 and capacitor C1 is connected between nodes 103 and 104. Node 102 is connected to the +V input terminal 101 and node 104 is connected to the GND input terminal 105.

The transformer TX1 is an embedded magnetic component and includes a first electrical winding defined between nodes 115 and 119, a second electrical winding defined between nodes 120 and 122, and an auxiliary winding defined between nodes 130 and 134. Node 117 is connected part way along the first electrical winding and node 132 is connected part way along the auxiliary winding defined between nodes 130 and 134. Nodes 117 and 132 therefore define tap terminals. In one example, the nodes 117 and 132 are connected to the midpoint of the respective windings, defining center-tap terminals. Thus, the first electrical winding is divided into two winding portions 116 and 118, and the auxiliary winding is divided into two auxiliary winding portions 131 and 133.

Two transistors TR1 and TR2 are provided to switch in and switch out an energizing voltage across the two portions of the first electrical winding portions 118 and 116, respectively. The transistors TR1 and TR2 are shown as being of npn-type, but other types are possible. High power switching transistors, for example, MOSFETs (metal oxide semiconductor field effect transistors) are suitable.

The collector of transistor TR2 is connected to a first end of the first electrical winding at node 115, and the collector of transistor TR1 is connected to a second end of the first electrical winding at node 119. The emitter of transistor TR1 and the emitter of transistor TR2 are both connected to node 106. Node 106 is electrically connected to nodes 107, 108, and 109, all of which are held at ground potential as indicated by GND in FIG. 1.

A first terminal of capacitor C2 is connected to node 109, and the other terminal of capacitor C2 is connected to node 110 which is connected directly to the high voltage input +V at node 102. Between node 110 and node 117 a resistor R3 is provided. A capacitor C3 is provided between nodes 111 and 108, in parallel with transistor TR2, and a capacitor C4 is provided between nodes 107 and 112, in parallel with transistor TR1. Node 111 is connected to the first end 115 of first electrical winding and to the collector of transistor TR2, and node 112 is connected to the second end 119 of the first electrical winding and to the collector of transistor TR1.

Each end of the auxiliary winding defined between nodes 130 and 134 is connected to one of the bases of the transistors TR1 and TR2. Thus, node 130 is connected to the base of transistor TR1, and node 134 is connected to the base of transistor TR2. Intermediate node 132 is connected the first terminal of a resistor R2, the second terminal of which is connected to node 103.

The input side circuit 100 oscillates between energizing the winding portion 116 and energizing the winding portion 118. When winding portion 118 is energized, the increasing magnetic flux passing through the core of transformer TX1 induces a voltage across the auxiliary winding portions 131 and 133. The induced voltage across auxiliary winding portion 131 is of the correct polarity to apply a voltage to the base terminal of transistor TR1 in order to keep transistor TR1 switched ON. A positive feedback arrangement is thus achieved, with TR1 being switched ON and TR2 being switched OFF. Eventually the magnetic field within the transformer core saturates and the rate of change of magnetic flux within it drops to zero. The voltage across the first electrical winding portion 118, and therefore the current through it, also drops to zero. The auxiliary windings 131 and 133 react to this change and an induced voltage, of reverse polarity, is set up across them. This has the effect of switching ON transistor TR2 and switching OFF transistor TR1, thus energizing the winding portion 116. Again, positive feedback is set up such that the voltage applied to the base of transistor TR2 by the auxiliary winding portion 133 maintains transistor TR2 in a switched ON state, while keeping transistor TR1 in a switched OFF state. Following this, the magnetic field within the core saturates and the circuit returns to energizing the winding portion 118. This oscillatory behavior, alternating between energizing the first electrical winding portions 118 and 116, continues indefinitely as long as input power is provided to the input terminals 101 and 105.

The output side of the transformer takes the form of a synchronized rectifier circuit 150, including first and second transistors Q1 and Q2, connected between first and second output terminals +Vout (140) and 0V (142). In FIG. 1, although the two transistors Q1 and Q2 are illustrated as inductive channel MOSFETs, any other suitable transistor technology may be used. Diode D1 is connected across transistor Q1, allowing current to flow from node 154 to node 152. Diode D2 is connected across transistor Q2, allowing current to flow from node 154 to node 155.

On the output side of the transformer TX1, a second electrical winding 121 is provided between nodes 120 and 122. Node 120 connects via nodes 151 and 155 to forward biased diode D3, which is in turn connected via nodes 156 and 159 to the +Vout output terminal 140. In this case, the +Vout output terminal 140 is a positive output terminal. Further, node 122 connects via nodes 152 and 153 to a further forward biased diode D4, which is in turn connected via nodes 157, 156, and 159 to the +Vout output terminal 140. Although diodes D3 and D4 are shown in FIG. 1 as Schottky diodes, normal rectifier diodes could equally well be used.

Node 151, located in between node 120 and the input of the diode D3, connects node 120 to the gate terminal of transistor Q1. Node 153, located in between node 122 and diode D4, connects node 122 to the gate terminal of transistor Q2. The drain terminal of transistor Q1 is connected to node 152 located in between the node 122 and diode D4. The drain terminal of transistor Q2 is connected to node 155 located in between the node 120 and the diode D3. The source terminals of the transistors Q1 and Q2 are both connected to node 154, which in turn is connected via nodes 158 and 160 to the 0V output terminal 142.

Capacitor C5 is connected across the +Vout and 0V output terminals 140 and 142. A first capacitor terminal is connected to node 157, between the output of diode D4 and the +Vout output terminal 140, while the other is connected to node 158, between the 0V output terminal 142 and the source terminals of transistors Q1 and Q2. Node 157 is connected to node 156, which is between diode D3 and the +Vout output terminal 140. Reverse biased Zener diode D5 is also connected across the output terminals, having one terminal connected to node 159 coupled to the +Vout output terminal 140, and the other terminal connected to node 160 coupled to the 0V output terminal 142.

The second electrical winding 121 has a voltage induced across it according to the rate of change of magnetic flux within the core of transformer TX1. An alternating current is therefore set up in the second electrical winding 121.

In a first mode of operation, the alternating current circulates in a first direction, though diode D3 which is forward biased, and via node 151 into the gate terminal of transistor Q1 turning it ON. When the transistor Q1 is ON, current flows through the transistor Q1 from source to drain and current flows in the winding 121 from the second node 122 to the first node 120 and to the +Vout output terminal 140 via diode D3. A positive voltage is therefore established between output terminals +Vout (140) and 0V (142). In this mode of operation, reverse biased diode D4 prevents current flowing into the gate terminal of the second transistor Q2, which remains turned OFF.

In a second mode of operation, the alternating current circulates in a second direction, through diode D4, which is now forward biased, and via node 153 into the gate terminal of transistor Q2 turning it ON. When the transistor Q2 is ON, current flows through the transistor Q2 from source to drain, and current flows in the winding 121 from node 120 to node 122 and to the +Vout output terminal 140 via diode D4. A positive voltage is therefore also established between output terminals +Vout (140) and 0V (142), as with the first mode of operation.

As the magnetic flux in the transformer TX1 changes, the magnitude and direction of the alternating current in the output circuit changes. The diodes D3 and D4 thus rectify the alternating current, so that the output provided to the terminals is always in the form of a positive voltage signal.

The capacitor C5 smoothes the output voltage signal to provide an approximately constant direct current between the output terminals 140 and 142. Diode D5 may also be connected across the output terminals, in order to limit the gate voltage at the transistors Q1 and Q2 to a specific range dependent on the value of the diode. A resistance may be used in place of the diode D5 as a dummy load. The circuit illustrated in FIG. 1 therefore defines an isolated DC to DC convertor, taking a DC input across the +V and GND input terminals 101 and 105, and generating a DC output across the +Vout and 0V output terminals 140 and 142. As will be appreciated by the skilled person, the voltage of the DC output relative to that of the DC input can be adjusted by varying the number of turns on the first windings 116, 118 and the second winding 121. Although in the embodiment of FIG. 1, the embedded transformer preferably is included in a Royer circuit, for example, it should be noted that its advantages may be realized in any power converter circuit topology including an embedded transformer.

Figure 2A:
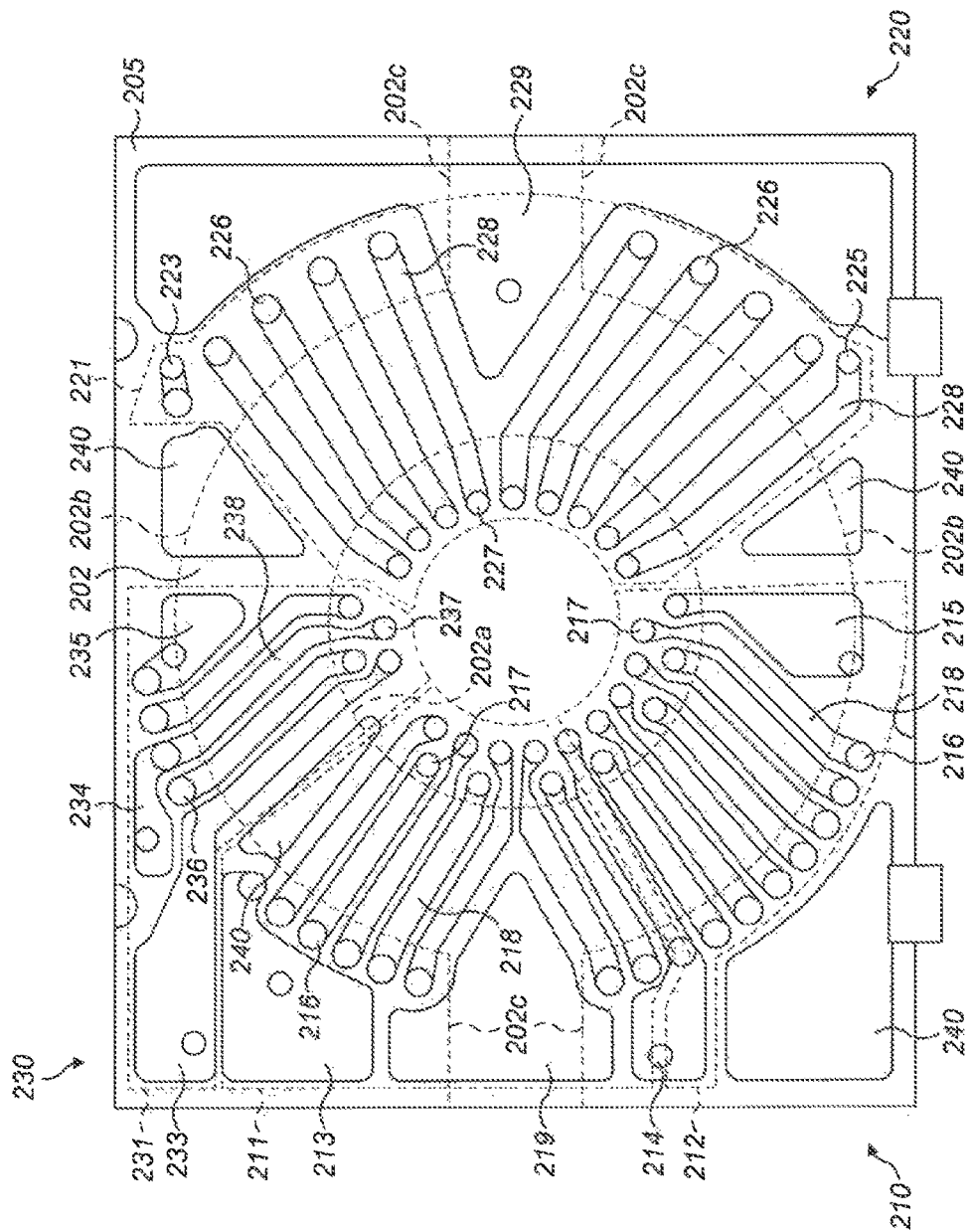
FIG. 2A illustrates an example arrangement for a comparative embedded transformer including a printed circuit board layout.

FIG. 2A illustrates a comparative embedded transformer and associated printed circuit board arrangement suitable for use in the power converter circuit of FIG. 1. Techniques for manufacturing an embedded magnetic component transformer are described in UK patent applications GB1414469.5 and GB1414468.7 filed by the present applicant, which are incorporated in their entireties herein by reference.

As shown in FIG. 2A, the embedded magnetic component transformer includes a first electrical winding 210 contained within the regions 211 and 212 of substrate 205. It further includes a second winding 220 in the region 221 of the substrate 205, and an auxiliary winding 230 in the region 231 of the substrate. Each of the regions 211, 212, 221, and 231 are bounded by dashed lines. These windings are disposed around a common magnetic transformer core (not shown in FIG. 2A) provided in a cavity 202 made within the insulating substrate 205. The magnetic core is positioned between the inner periphery 202a and outer periphery 202b of the cavity 202. The edges of the cavity 202 may also extend outwards at each side of the substrate 205 along the cavity side channel walls 202c in order to form side channels. As shown in FIG. 2A, the regions 211, 212, 221, and 231 are separate from one another and occupy discrete areas of the substrate 205. The windings do not therefore overlap with one another. The central island formed by the cavity 202 may be called the isolation region as it is designed to provide some isolation between the first and second sides of the transformer.

The first, second, and auxiliary electrical windings of the transformer are defined by upper and lower conductive traces positioned on the top and bottom of the substrate, and connected by a plurality of respective conductive vias passing through the substrate from one side to the other.

The first portion of the first electrical winding is contained within region 211, on the input side of the transformer. The winding portion starts at end terminal 213 and includes outer conductive vias 216 and inner conductive vias 217, connected together by conductive traces 218, to define a coil arrangement. FIG. 2A shows the upper side of the embedded transformer and therefore only the upper conductive traces 218 are visible. Lower conductive traces, which also connect outer 216 and inner 217 conductive vias to complete the coil arrangement, are provided on the lower side of the insulating substrate 205. The first portion of the first electrical winding ends at a tap terminal 214, which in this example is electrically positioned approximately mid-way along the primary electrical winding.

The second portion of the first electrical winding is contained within region 212 and again includes outer 216 and inner 217 conductive vias together with upper 218 and lower (not visible) conductive traces. The second portion of the first winding starts at tap terminal 214 and continues until its end terminal 215. The first and second winding portions are therefore wound continuously, one following the other, on the transformer core. Copper plane 219 can be provided part way along the first electrical winding to adjust the leakage inductance and/or distributed capacitance of the winding.

In the example of FIG. 2A, the outer conductive vias 216 are provided in a single row along a substantially circular arc, adjacent the outer periphery 202b of the cavity 202. The inner conductive vias 217 are provided in a staggered arrangement including two rows, to enable them to fit within the limited space available within the inner periphery 202a of the cavity 202.

The second electrical winding is contained within region 221, on the output side of the transformer. The second electrical winding starts at end terminal 223 and includes outer conductive vias 226 and inner conductive vias 227, connected together by upper conductive traces 228 and lower conductive traces (not shown), to define a coil arrangement ending at end terminal 225. As with the first electrical winding, a copper plane 229 can be provided part way along the second electrical winding to adjust the leakage inductance and distributed capacitance of the windings.

The auxiliary winding is contained within region 231, on the input side of the transformer. The auxiliary electrical winding starts at end terminal 233 and includes outer conductive vias 236 and inner conductive vias 237, connected together by upper conductive traces 238 and lower conductive traces (not shown), to define a coil arrangement ending at end terminal 235. A tap terminal 234 is provided part way along the auxiliary winding.

Note that, for clarity, in FIG. 2A only some of the inner and outer conductive vias, and only some of the conductive traces, are labelled. Copper planes 240, which may be ground planes, can be provided around the transformer windings to adjust the leakage inductance and/or distributed capacitance of the transformer.

As will be understood by the skilled person, the first electrical winding may have the same number of inner 217 and outer 216 conductive vias defining the complete first electrical winding. This ensures that the terminals 213 and 215 at either end of the first electrical winding are on the same side, for example on top of the insulating substrate 205 or a cover layer if one is provided, or on the bottom of the insulating substrate 205. Alternatively, it is also possible to provide the first electrical winding with an arrangement where there is one more inner conductive via 217 than there are outer conductive vias 216, or where there is one fewer inner conductive vias 217 than there are outer conductive vias 216. Such an arrangement means that the terminals 213 and 215 at either end of the first electrical winding are on opposing sides of the insulating substrate 205. Both of these alternatives, where the end terminals are on the same or opposing sides, may be desirable depending on the location of the input and output circuitry to which the terminals are to be connected. The second electrical winding and/or auxiliary winding may also be similarly arranged.

In some preferred embodiments of the present invention, such when the embedded transformer is included in the circuit illustrated in FIG. 1, the voltage across the auxiliary winding 230 is fed back to the input circuitry being used to energize the first winding 210, the auxiliary winding 230 acting as a feedback winding. Alternatively or additionally, the auxiliary winding 230 can be used to control some other aspect of the input and/or output circuitry. Other uses of the auxiliary winding could be to provide a housekeeping supply or to control a synchronous rectifier. More than one auxiliary winding could be provided, allowing more than one of these functions to be carried out. Other uses for the auxiliary windings are also possible. Furthermore, it is not always necessary to have an auxiliary winding. This will be the case, for example, if a synchronous rectifier is provided on the output side of the transformer and the input side is controlled independently.

As will be appreciated by the skilled person, when the transformer is in operation the ratio of the voltages provided across the first, second, and auxiliary windings is proportional to the number of turns in each respective winding. Therefore the number of turns in each winding can be chosen, by adding or removing conductive vias and conductive traces, in order to obtain desirable voltage ratios between the windings. This is particularly important in, for example, isolated DC to DC converters where strict requirements as to the output voltage will typically need to be met.

Figure 2B:
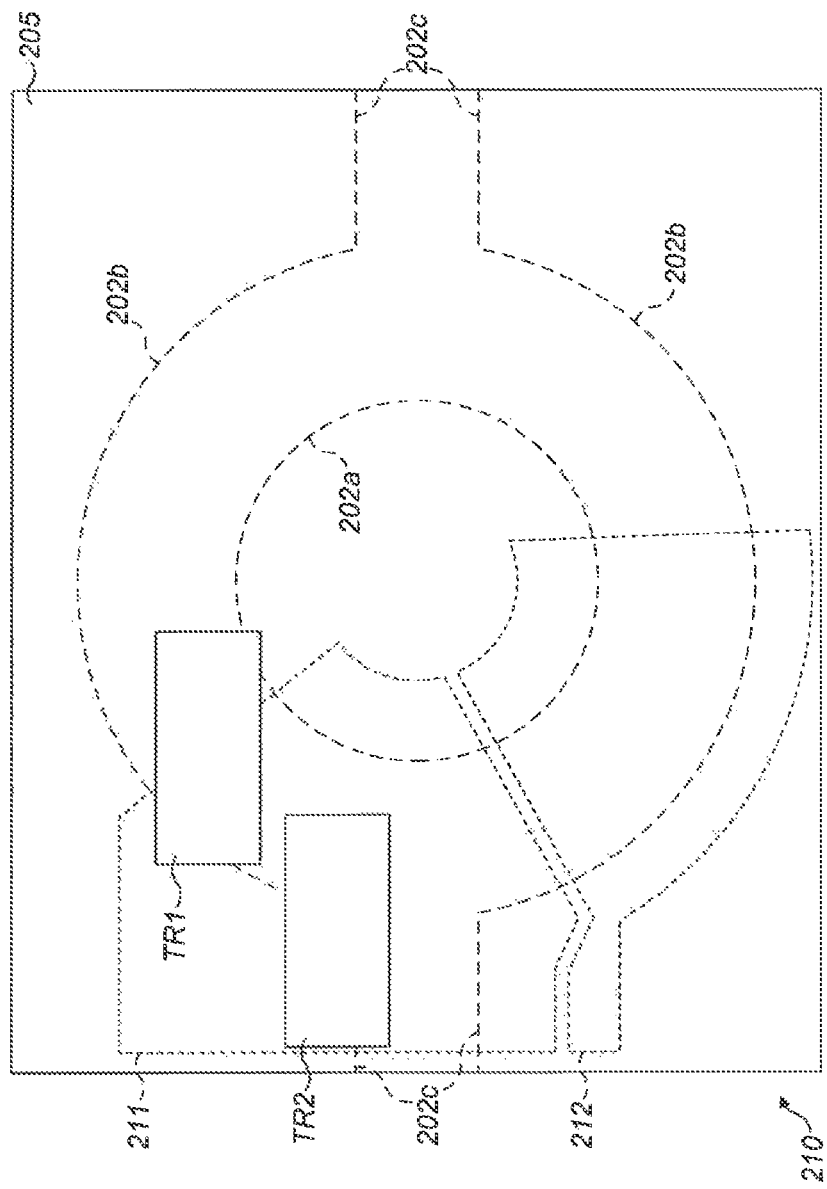

FIG. 2B shows the insulating substrate 205 and the locations of the inner 202a and outer 202b peripheries of the cavity. The cavity side channel walls 202c are also shown, as are the outlines of the regions 211 and 212 respectively defining areas in which the first and second portions of the first electrical winding occupy. Note that the arrangement in FIG. 2B is intended to correspond to that in FIG. 2A, although the details of FIG. 2A have been omitted for the sake of clarity.

Also shown in FIG. 2B are the positions of the transistors TR1 and TR2 above the printed circuit board layer of FIG. 2A. Transistors TR1 and TR2 are responsible for energizing the first and second portions of the first electrical winding, as explained in relation to the preferred embodiment of FIG. 1. When used with power converter circuitry, and in particular a self-oscillating push-pull (Royer) circuit configuration as illustrated in FIG. 1, the transistors TR1 and TR2 act to alternately energize the first and second winding portions of the first electrical winding. In one example, TR1 may be ON and lead to a voltage being applied across the winding portion within region 211, while TR2 is switched OFF and the winding portion within region 212 is idle. At a later time, TR1 switches OFF and TR2 switches ON, thus applying a voltage across the winding portion within region 212 while the winding portion within region 211 is idle. The winding portions within regions 211 and 212 are never energized simultaneously.

With the components arranged as shown in FIG. 2B, the transistors TR1 and TR2 are subject to different thermal environments during use of the embedded transformer. In particular, when TR1 is ON it is exposed to heat from the windings within region 211 which are energized, in addition to the heating resulting from the current it is conducting. TR1 is therefore exposed to a double heating effect which switched ON. In contrast, when transistor TR2 is ON the windings in region 212 are energized, but TR2 is not exposed to the same amount of heating from these windings because it is located further from them. Therefore, the thermal stress applied to each transistor TR1, TR2 during the switching cycle is different.

Figure 2C:
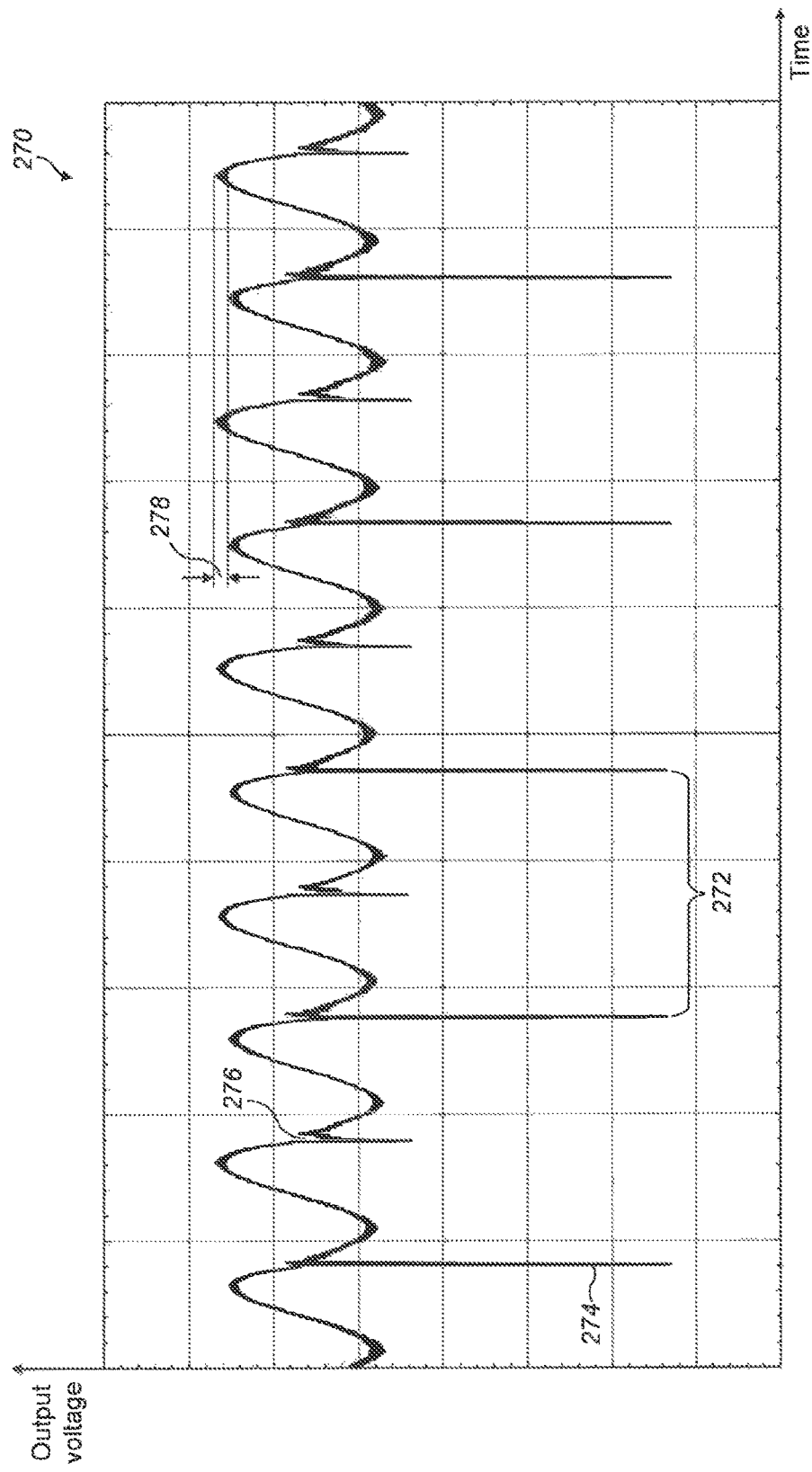
FIG. 2C is a graph illustrating variations in the primary coil voltage over time for the embedded transformer of FIG. 2A.

The effect of these differences on the performance of the embedded transformer is illustrated by the graph 270 in FIG. 2C. The graph plots the output voltage between the output nodes of a circuit containing the embedded transformer of FIG. 2A on the y-axis. Time is plotted on the x-axis. The general behavior shows an oscillating voltage, with adjacent peaks corresponding to the different winding portions being energized. The complete switching cycle, during which both portions of the first electrical winding are consecutively energized, is indicated by the time period 272 of the waveform. Ideally, for identical winding portions and identical energizing transistors, the two oscillations which take place within the time period 272 would be the same. However, a number of asymmetries are present which lead to a deviation from a purely symmetric oscillatory response between the first and second winding portions. In particular, the ripple 274 and ripple 276, which result from noise generated respectively when the first and second transistors switch, is not symmetric. The ripple 274 is much greater than the ripple 276. There is also a difference in the amplitude of oscillation between peaks associated with different transistors. This difference can be seen as the voltage 278.

The difference in size of ripple and the difference in peak voltage achieved between parts of the cycle associated with different transistors is attributable to the positions of the first and second portions of the first electrical winding underneath the transistors TR1 and TR2. As explained above, the heating effect of the two coil portions is different for the two transistors, and therefore TR1 is exposed to a higher thermal stress when working compared to that of TR2. A further cause of the asymmetry can be an imbalance in electrical path lengths from the winding portions to the transistors. This leads to one of the transistors conducting for a greater proportion of the switching cycle, with the result that the stress on that transistor is increased.

Figure 3A:
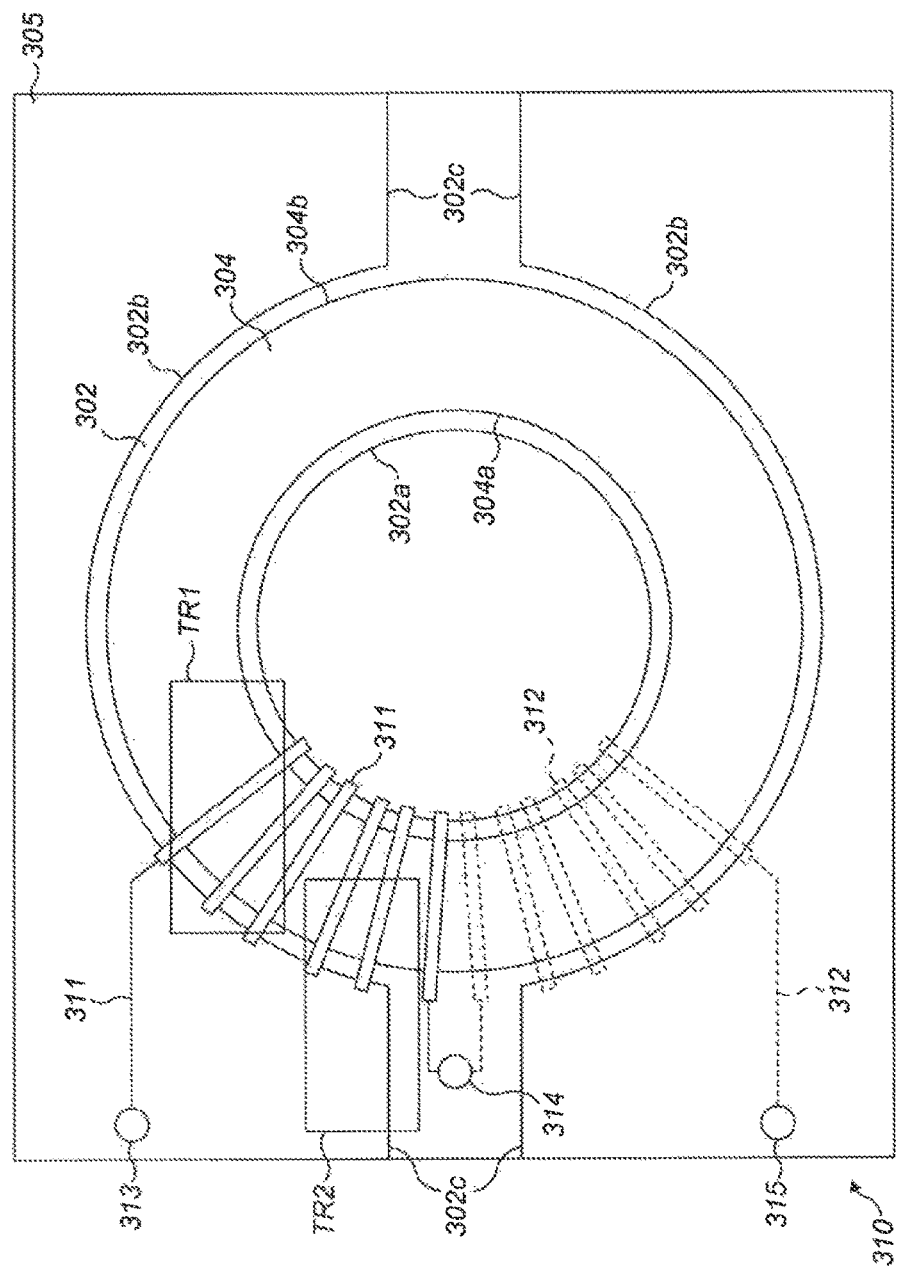
FIG. 3A illustrates an example of a comparative embedded transformer, including a schematic diagram of the first electrical winding.

FIG. 3A is a schematic diagram of an embedded transformer according to a comparative example. For simplicity, only the first electrical windings 310 are shown on the transformer, and the second and auxiliary electrical windings are omitted from FIG. 3A. A cavity 302, defined between inner 302a and outer 302b cavity walls, is shown within insulating substrate 305. A magnetic core 304 is inserted into the cavity 302, including inner 304a and outer 304b edges. Cavity side channel walls 302c are also provided. For reference, the locations of transistors TR1 and TR2 are indicated superimposed on the diagram of the embedded transformer.

The windings of the transformer are indicated by boxes (either of solid or dashed outline) spanning the width of the cavity 302 and enclosing the magnetic core 304. As this is a schematic diagram, the precise arrangement of inner and outer conducting vias and upper and lower conducting traces is not shown. However, it should be understood that adjacent solid-outlined boxes are connected together on the lower side of the insulating substrate 305 so as to define a first portion 311 of the first electrical winding. Similarly, adjacent dashed-outline boxes are connected together on the lower side of the insulating substrate 305 to define a second portion 312 of the first electrical winding.

The first portion 311 of the first electrical winding begins at end terminal 313, continues along an electrical connection to the coil, includes those turns of the coil depicted by solid-outlined boxes, continues along an electrical connection to tap terminal 314, and ends at tap terminal 314. The second portion 312 of the first winding begins at tap terminal 314, continues along the electrical connection shown by a dashed line to the coil, includes those turns of the coil depicted by dash-outlined boxes, and continues along the electrical connection shown by a dashed line into end terminal 315. The windings of the first winding portion 311 are grouped separately from the windings of the second winding portion 312. The first 311 and second 312 winding portions are therefore wound in a continuous configuration around magnetic core 304, and occupy separate regions of the substrate 305.

As explained above in relation to FIGS. 2A and 2B, transistor TR1 is exposed to a higher thermal stress when working compared to that of transistor TR2. This is because TR1 energizes the first winding portion 311, above which it is located. In contrast, TR2 energizes the second winding portion 312 and is not located above these windings. A printed circuit board layout suitable for use with the winding arrangement of FIG. 3A was discussed above in relation to FIG. 2A.

Figure 3B:
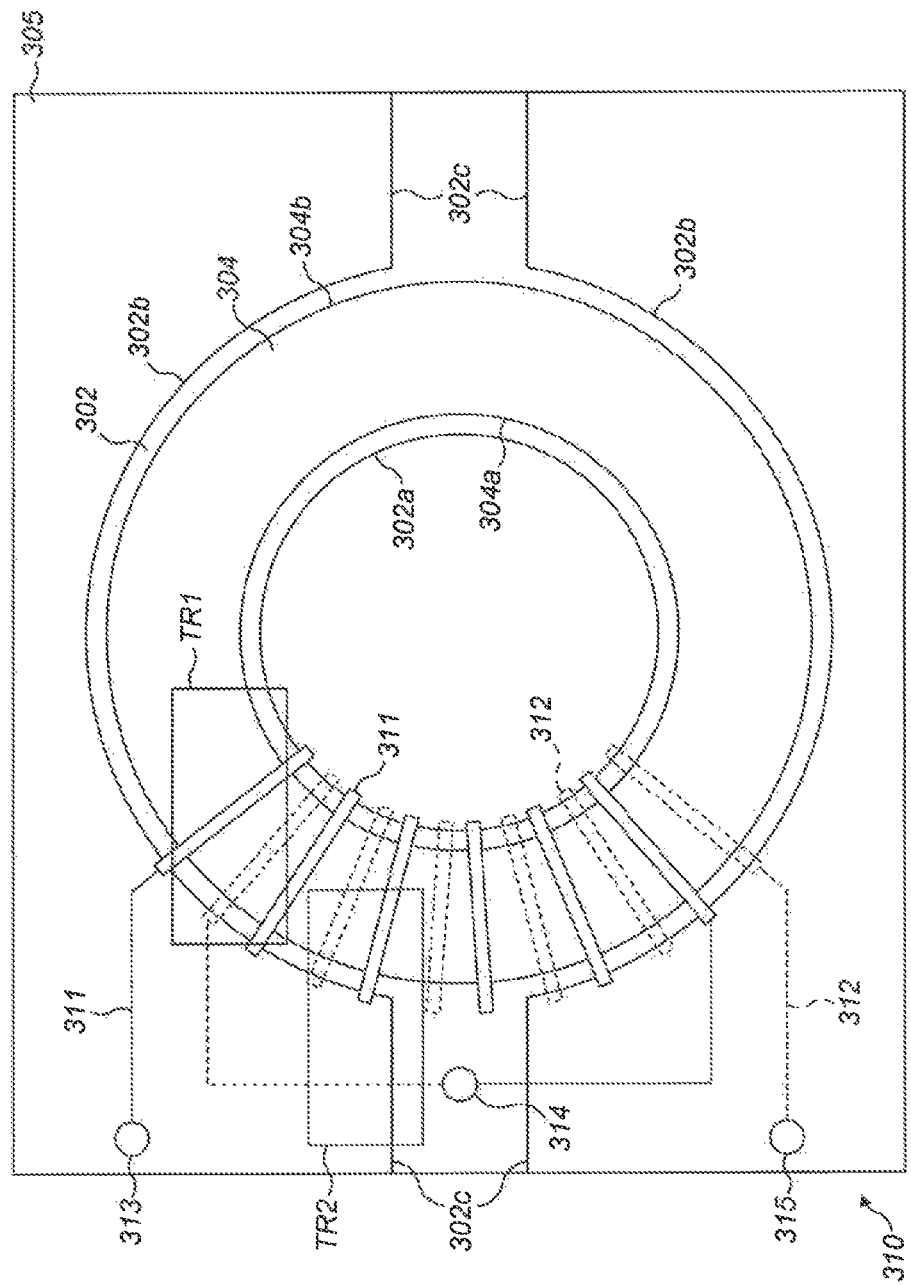
FIG. 3B illustrates an embedded transformer according to a preferred embodiment of the present invention, including a schematic diagram of the first electrical winding.

FIG. 3B is a schematic diagram of an embedded transformer according to a preferred embodiment of the present invention. For simplicity and as with FIG. 3A, only the first electrical windings 310 are shown on the transformer, and the second and auxiliary electrical windings are omitted from FIG. 3B. It should be understood that these components, which have already been discussed in relation to FIGS. 2A and 2B above, can also be included within the present and following preferred embodiments, and the discussion in relation to FIGS. 2A and 2B applies equally to these preferred embodiments.

A cavity 302, defined between inner 302a and outer 302b cavity walls, is shown within the insulating substrate 305. A magnetic core 304 is inserted into the cavity 302, including inner 304a and outer 304b edges. Cavity side channel walls 302c are also provided. For reference, the locations of transistors TR1 and TR2 are indicated superimposed on the diagram of the embedded transformer.

The windings of the transformer are indicated by boxes (either of solid or dashed outline) spanning the width of the cavity 302 and enclosing the magnetic core 304. As this is a schematic diagram, the precise arrangement of inner and outer conducting vias and upper and lower conducting traces is not shown. However, it should be understood that adjacent solid-outlined boxes are connected together on the lower side of the insulating substrate 305 so as to define a first portion of the first electrical winding. Similarly, adjacent dashed-outline boxes are connected together on the lower side of the insulating substrate 305 to define a second portion of the first electrical winding. As shown in FIG. 3B, turns belonging to the first and second portion of the first electrical winding alternate as one moves along the cavity in a circumferential direction. The first and second portions of the first electrical winding are therefore interleaved with one another, defining a synchronized arrangement instead of the continuous arrangement of FIGS. 2A, 2B, and 3A.

The first portion 311 of the first electrical winding, which in this example is energized by transistor TR1, begins at end terminal 313, continues along an electrical connection to the coil, includes those turns of the coil depicted by solid-outlined boxes, continues along an electrical connection to tap terminal 314, and ends at tap terminal 314. The second portion 312 of the first winding, which in this example is energized by transistor TR2, begins at tap terminal 314, continues along the electrical connection shown by a dashed line to the coil, includes those turns of the coil depicted by dash-outlined boxes, and continues along the electrical connection shown by a dashed line into end terminal 315. Tap terminal 314 may be arranged so that it is substantially mid-way along the first winding, in which case it is a center-tap terminal. The tap terminal 314 is located at an angular position around the outer periphery 202b of the cavity 202 that is between the end terminals 313 and 315 of the first electrical winding. However, the precise positions of end terminals 313 and 315, and tap terminal 314, can vary between different preferred embodiments and will be determined by the location of the surrounding electrical components to which these terminals must be connected.

Arranging the first electrical windings so that they are interleaved distributes the heat generated by energizing the first and second winding portions over the entire angular extent of the windings. Therefore, the heat transferred to each of the transistors TR1 and TR2 is more constant over the switching cycle than can be obtained using the embedded transformer of FIGS. 2A and 2B. This reduces the variations in thermal stress over the switching cycle, giving rise to a more balanced and symmetric behaviour as the transistors TR1 and TR2 are alternately switched ON. Further, the electrical path lengths from the first electrical winding to the transistors TR1 and TR2 can be made equal or substantially equal, thus minimizing the flux imbalance between the two winding portions and allowing the transistors to conduct for equal or substantially equal proportions of the switching cycle.

As shown in FIG. 3B, the position of transistor TR1 is such that it includes a larger overlapping area with the first electrical winding than transistor TR2. Therefore, transistor TR1 is subject to a greater amount of heating from the first electrical winding 310 than transistor TR2. In the preferred embodiment of FIG. 3B, both TR1 and TR2 overlap both of the first and second winding portions of the first electrical winding. In alternative preferred embodiments, only transistor TR1 overlaps both of the first and second winding portions of the first electrical winding. Transistor TR2 can be positioned such that it only overlaps the winding portion that is energized by transistor TR1.

Figure 3C:
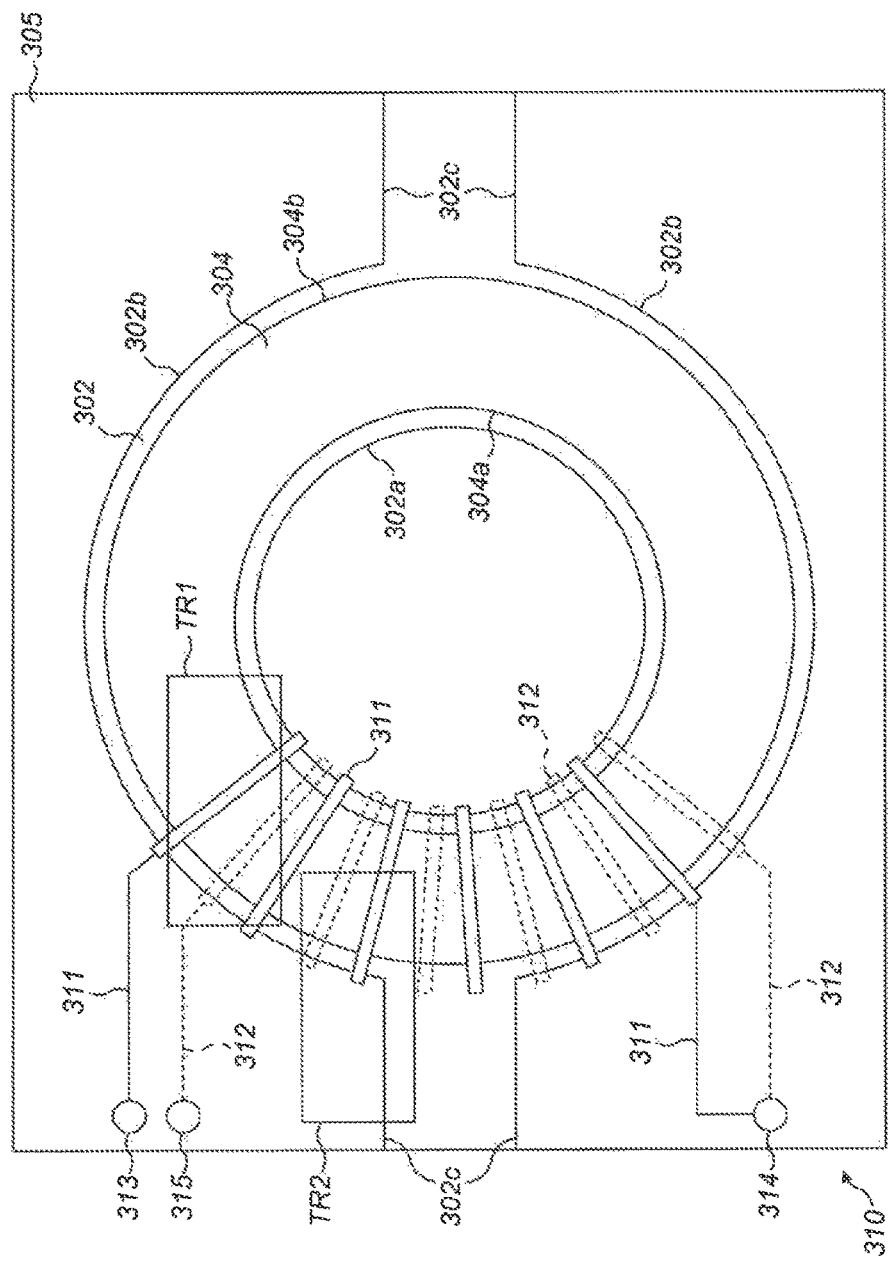
FIG. 3C illustrates an embedded transformer according to a preferred embodiment of the present invention, including a schematic diagram of the first electrical winding.

FIG. 3C is a schematic diagram of an embedded transformer according to another preferred embodiment of the present invention. The cavity, magnetic core, and their boundaries are the same as described in relation to the preferred embodiment of FIG. 3B. As with FIG. 3B, only the first electrical windings 310 are shown on the transformer, and the second and auxiliary electrical windings are omitted from FIG. 3C for simplicity. The windings of the transformer are indicated by boxes (either of solid or dashed outline) spanning the width of the cavity 302 and enclosing the magnetic core 304. Again, the precise arrangement of inner and outer conducting vias and upper and lower conducting traces is not shown. As with FIG. 3B, adjacent solid-outlined boxes are connected together on the lower side of the insulating substrate 305 so as to define a first portion of the first electrical winding, and adjacent dashed-outline boxes are connected together on the lower side of the insulating substrate to define a second portion of the first electrical winding. As shown in FIG. 3C, turns belonging to the first and second portion of the first electrical winding alternate as one moves along the cavity in a circumferential direction. The first and second portions of the first electrical winding are therefore interleaved with one another.

The first portion 311 of the first electrical winding, which in this example is energized by transistor TR1, begins at end terminal 313, continues along an electrical connection to the coil, includes those turns of the coil depicted by solid-outlined boxes, continues along an electrical connection to tap terminal 314, and ends at tap terminal 314. The second portion 312 of the first winding, which in this example is energized by transistor TR2, begins at tap terminal 314, continues along the electrical connection shown by a dashed line to the coil, includes those turns of the coil depicted by dash-outlined boxes, and continues along the electrical connection shown by a dashed line into end terminal 315. As in the previous preferred embodiment, tap terminal 314 may be arranged so that it is substantially mid-way along the first winding, in which case it is a center-tap terminal.

The embodiment of FIG. 3C differs from that of FIG. 3C in that the two end terminals 313, 315 are positioned adjacent one another at a first end of the first electrical winding, and the tap terminal 314 is positioned at a second end of the first electrical winding. Thus, the second end terminal 315 is located at an angular position around the outer periphery 302b of the cavity 302 that is between the first end terminal 313 and the tap terminal 314 of the first electrical winding. This positioning may suit a different arrangement of the electronic components mounted above or below the embedded transformer to that of FIG. 3b. In an alternative preferred embodiment, the first end terminal 313 is located at an angular position around the outer periphery 302b of the cavity 302 that is between the second end terminal 315 and the tap terminal 314 of the first electrical winding. As with the preferred embodiment of FIG. 3B, the precise positions of end terminals 313 and 315, and tap terminal 314, can vary and will be determined by the location of the surrounding electrical components to which these terminals must be connected.

As the first and second winding portions are interleaved, the advantages relating to heat distribution, heat transfer to the transistors TR1 and TR2, and thermal stress apply equally to the preferred embodiment of FIG. 3C for the same reasons as described in relation to the embodiment of FIG. 3B. Further, the electrical path lengths from the first electrical winding to the transistors TR1 and TR2 can be made equal or substantially equal, thus minimizing the flux imbalance and allowing the transistors to conduct for equal or substantially equal proportions of the switching cycle.

In FIG. 3C, as with FIG. 3B, the position of transistor TR1 is such that it includes a larger overlapping area with the first electrical winding than transistor TR2. Therefore transistor TR1 is subject to a greater amount of heating from the first electrical winding 310 than transistor TR2. In the preferred embodiment of FIG. 3C, both TR1 and TR2 overlap both of the first and second winding portions of the first electrical winding. In alternative preferred embodiments, only transistor TR1 overlaps both of the first and second winding portions of the first electrical winding. Transistor TR2 can be positioned such that it only overlaps the winding portion that is energized by transistor TR1.

In some preferred embodiments, the second electrical winding can also be split into third and fourth winding portions in a similar way to the first and second portions of the first electrical winding. An additional tap terminal, connected to the second electrical winding, can be provided. The turns of the third winding portion can be interleaved with the turns of the fourth winding portion, to enable an even distribution of heat on the output side. Further, the electrical path lengths from the second electrical winding to transistors or other switching elements connected across the third and fourth winding portions can be made equal or substantially equal, thus minimizing the flux imbalance on the output side and allowing the transistors connected to the second electrical winding to conduct for equal or substantially equal proportions of the switching cycle.

Although FIGS. 3B and 3C show all of the turns of the first portion of the first electrical winding being interleaved with turns of the second portion of the first electrical winding, in other preferred embodiments it is possible that only one, or more than one, turn is interleaved in this way.

Figure 4:
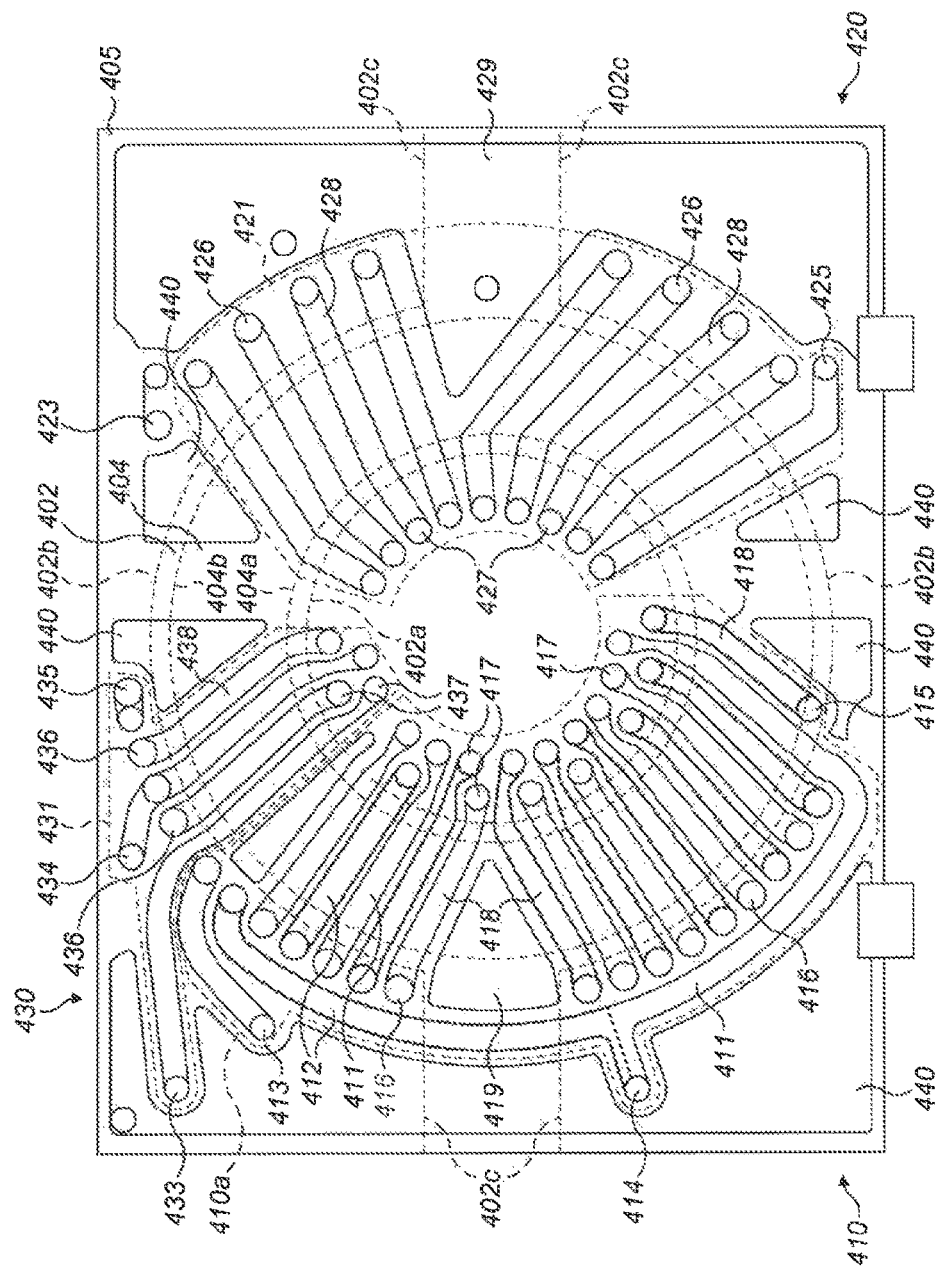
FIG. 4 illustrates a printed circuit board layout for an embedded transformer according to a preferred embodiment of the present invention.

FIG. 4 shows an example printed circuit board layout for the upper layer of an embedded transformer. The arrangement of the first electrical windings is similar to that depicted in FIG. 3B. As with the previous preferred embodiments, a cavity 402 is provided in an insulating substrate 405 between inner 402a and outer 402b peripheries. Cavity side channel walls 402c are also provided. A magnetic core 404, having inner 404a and outer 404b edges, is inserted in the cavity 402.

A first electrical winding 410 is located within region 410a. A second electrical winding 420 is located within region 421, and an auxiliary winding 430 is located within region 431. All of these regions are bounded by dashed lines in FIG. 4. The first electrical winding includes outer 416 and inner 417 conductive vias linked by conductive traces 418, as explained in relation to the previous preferred embodiments. Similarly, the second electrical winding 420 includes outer 426 and inner 427 conductive vias linked by conductive traces 428, and the auxiliary winding 430 includes outer 436 and inner 437 conductive vias linked by conductive traces 438.

As in the previous preferred embodiments, the first electrical winding includes first 411 and second 412 winding portions. Those conductive traces defining a part of the first portion 411 are shown in FIG. 4 with a solid outline, whereas those conductive traces defining a part of the second portion 412 are shown with a dashed outline superimposed. The first portion begins at end terminal 413 and continues along a conductive trace to the coil. It includes those conductive traces 411 shown in solid outline, and the final conductive trace defines an electrical path to the tap terminal 414 where the first winding portion 411 ends.

The second winding portion starts at the tap terminal 414 and continues along the conductive trace shown with a dashed outline to the coil. It includes those conductive traces 412 shown in dashed outline, and the final conductive trace connects to end terminal 415. As before, in one example, the first 411 and second 412 winding portions are respectively energized by transistors TR1 and TR2 (not shown in FIG. 4). Note that the transistors TR1 and TR2 are positioned above the PCB of FIG. 4, for example, in the positions shown in FIGS. 3B and 3C relative to the cavity 302. As the turns belonging to the first 411 and second 412 winding portions are interleaved, the advantages noted above relating to heat distribution, heat transfer to the transistors TR1 and TR2, and thermal stress apply equally to this preferred embodiment for the same reasons as described in relation to the previous embodiments. Further, the electrical path lengths from the first electrical winding to the transistor TR1, and from the first electrical winding to the transistor TR2, can be made equal or substantially equal thus minimizing the flux imbalance and allowing the transistors to conduct for equal or substantially equal proportions of the switching cycle.

The second electrical winding 420 and auxiliary winding 430 are similar to those discussed in relation to FIG. 2A, with reference numbers 4XX in FIG. 4 corresponding to reference numbers 2XX in FIG. 2A. The description of these windings above, in relation to FIG. 2A, therefore applies equally to the present preferred embodiment.

A conductive plane 419 can be provided part-way along the first electrical winding, to allow the leakage inductance and distributed capacitance of the winding to be adjusted. Copper planes 440, which may be ground planes, can be provided around the transformer windings to adjust the leakage inductance and/or distributed capacitance of the transformer.

In some preferred embodiments, the second electrical winding can also be split into two winding portions as discussed above. Although FIG. 4 shows all of the turns of the first portion of the first electrical winding being interleaved with turns of the second portion of the first electrical winding, in other preferred embodiments it is possible that only one, or more than one, turn is interleaved in this way.

Figure 5:
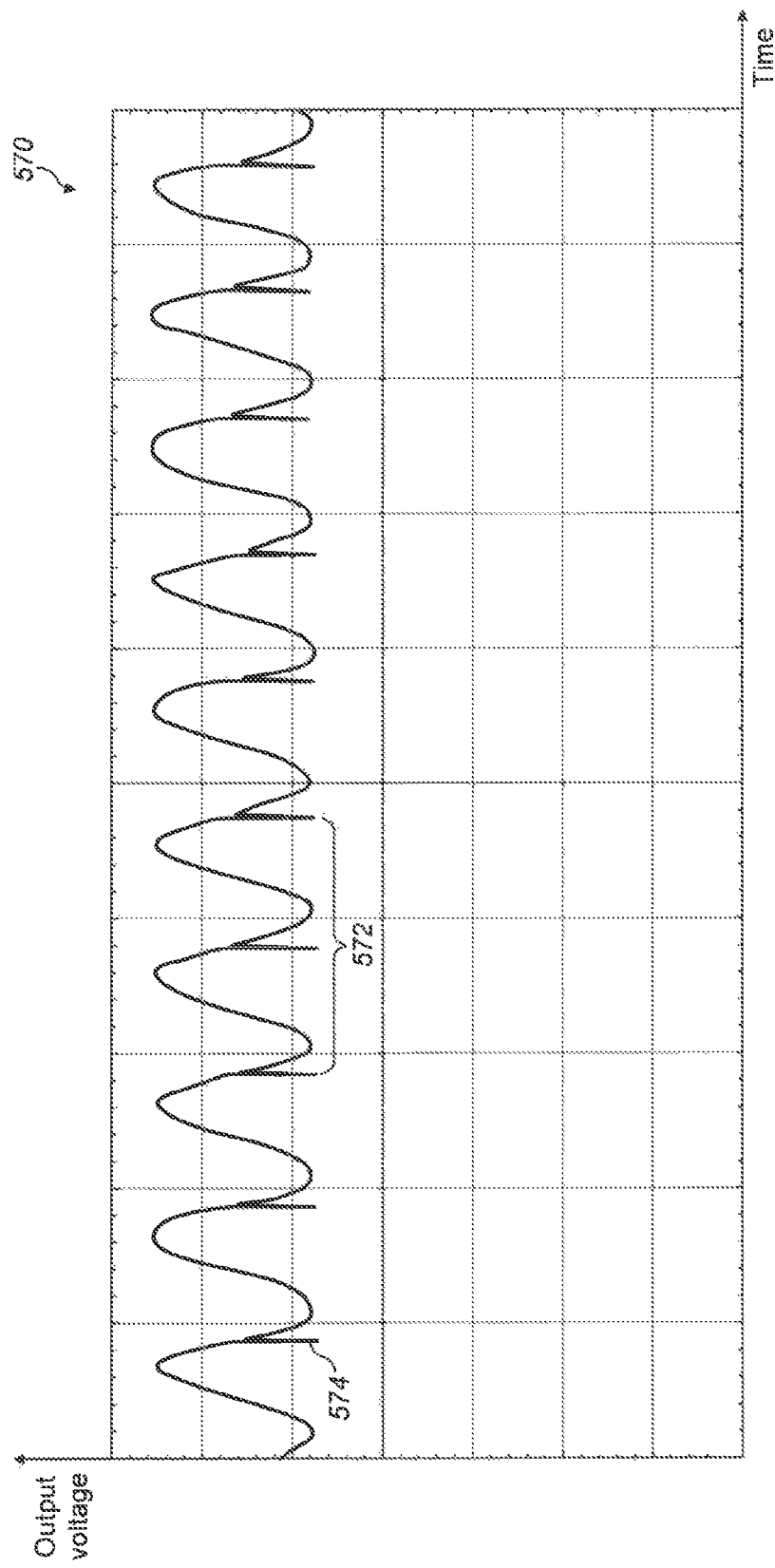
FIG. 5 illustrates variations in a primary coil voltage over time, for an embedded transformer according to a preferred embodiment of the present invention.

Example characteristics of an embedded transformer according to a preferred embodiment of the present invention are illustrated by the graph 570 in FIG. 5. The graph illustrates the output voltage between the output nodes 140, 142 of a circuit containing the embedded transformer of FIG. 4 on the y-axis. Time is plotted on the x-axis. This graph should be compared to the graph of FIG. 2C which shows a corresponding plot for the comparative embedded transformer. As in FIG. 2C, adjacent peaks in the graph 570 correspond to the different winding portions of the first electrical winding being energized. The complete switching cycle is indicated by the time period 572, and within this time period both oscillations have a similar shape and similar peak-to-peak voltage. In addition, the ripple 574 caused by the switching of the transistors is more symmetric than in FIG. 2C. As discussed above, the improvements in the electrical characteristics of the embedded transformer are the result of more even heat transfer to the transistors TR1 and TR2, together with equal or substantially equal path lengths from each of the transistors to the transformer windings. This prevents an asymmetry in the amount of stress exerted on each transistor during the switching cycle, and also helps to ensure that each transistor is switched ON for an equal or substantially equal amount of time.

Although reference is made to conductive vias throughout the present application, it should be noted that any conductive connecting elements, for example, conductive pins or filaments, can equally well be used in place of any one or more of the conductive vias. The conductive vias may include plated via holes. The elements referred to in the above description as copper planes and conducting traces can be made of any suitably conductive material and are not limited to copper conductors.

Although the conductive traces are shown as having a uniform or approximately uniform width, it is also possible for the width to vary. For example, if there are fewer turns on the second electrical winding than the first electrical winding, there may be space to allow the conductive traces of the second electrical winding to be wider. This reduces the resistance of the windings and therefore decreases the amount of heating they produce in operation. Any of the upper and/or lower conductive traces belonging to the first and/or second and/or auxiliary electrical windings, of only some of the conductive traces therein, can be of greater width than conductive traces of the other windings depending on the space available on the circuit board.

The first and second electrical windings discussed in relation to the previously presented preferred embodiments can each either be primary transformer windings being connected to the input power supply of the transformer, or secondary transformer windings being connected to the output of the transformer. The embedded transformer can be either a step-up or step-down transformer.

Although in the examples above the magnetic cores 304, 404 and cavities 202, 302, 402 are illustrated as being circular or substantially circular in shape, they may have a different shape in other preferred embodiments. Non-limiting examples include an oval or elongate toroidal shape, a toroidal shape having a gap, EE, EI, I, EFD, EP, UI and UR core shapes. The magnetic cores 304, 404 may be coated with an insulating material to reduce the possibility of breakdown occurring between the conductive magnetic core and the conductive vias or metallic traces. The magnetic core may also have chamfered edges providing a profile or cross section that is rounded.

In other preferred embodiments, different numbers of turns on the first electrical winding side and second electrical winding side may be used to those discussed above and shown in the figures. Known Royer circuits, for example, may include 16 turns for the first electrical winding side and 18 turns for the second electrical winding side. The transformer illustrated in FIG. 4 therefore reduces the number of turns required for the second electrical winding side by substituting the known Royer circuit output for a synchronized rectifier circuit. In alternative preferred embodiments, the transformer in FIG. 4 may be adapted so that the first electrical winding side turns are reduced, using a half bridge circuit on the first electrical winding side and a normal Royer output on the second electrical winding side. This would reduce the number of turns needed for the transformer by 6 on the first electrical winding side compared with the known Royer circuit device.

Alternatively, both of the first electrical winding and second electrical winding could have reduced turns, by using a half bridge circuit on the first electrical winding side, and a synchronized rectifier circuit on the second electrical winding side. This would reduce the number of turns required from the known Royer circuit configuration by 13. In all cases, reducing the number of turns provides more flexibility in the design layout, bringing higher potential isolation between the components and the possibility of more even heat distribution. However, reducing the number of turns on the electrical winding requires only one additional transistor (e.g. in a FET dual package) to be added to the circuit. Reducing the number of turns of the first electrical winding requires a half bridge circuit to be provided meaning more components on the first electrical winding side compared with the known Royer design.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A power electronics device comprising:
an embedded transformer; and
first and second transistors; wherein
the embedded transformer includes:
  an insulating substrate including a first side and a second side opposite the first side, and including a cavity therein, the cavity including an inner periphery and an outer periphery;
  a magnetic core housed in the cavity and including a first section and a second section;
  a first electrical winding, passing through the insulating substrate and disposed around the first section of the magnetic core; and
  a second electrical winding, passing through the insulating substrate and disposed around the second section of the magnetic core; wherein
  each of the first and second electrical windings includes:
    upper conductive traces disposed on the first side of the insulating substrate;
    lower conductive traces disposed on the second side of the insulating substrate;
    inner conductive connectors passing through the insulating substrate adjacent an inner periphery of the magnetic core, the inner conductive connectors respectively defining electrical connections between respective ones of the upper conductive traces and respective ones of the lower conductive traces; and
    outer conductive connectors passing through the insulating substrate adjacent an outer periphery of the magnetic core, the outer conductive connectors respectively defining electrical connections between respective ones of the upper conductive traces and respective ones of the lower conductive traces; wherein
    the upper and lower conductive traces and inner and outer conductive connectors defining respective turns of the first and second electrical windings;
  the first electrical winding includes:
    a first end terminal and a second end terminal;
    a tap terminal;
    a first winding portion between the first end terminal and the tap terminal; and
    a second winding portion between the second end terminal and the tap terminal; wherein
    the first transistor energizes the first winding portion;
    the second transistor energizes the second winding portion;
    the first and second winding portions are energized alternately; and
    at least one of the turns of the first winding portion is interleaved between the turns of the second winding portion.

2. The power electronics device of claim 1, wherein all of the turns of the first winding portion are interleaved with the turns of the second winding portion.

3. The power electronics device of claim 1, wherein the first winding portion includes a same number of turns as the second winding portion.

4. The power electronics device of claim 1, wherein the tap terminal is located on an electrical path that is equidistant or substantially equidistant from each of the first end terminal and the second end terminal.

5. The power electronics device of claim 1, wherein
the first transistor is electrically connected to the first end terminal via a first conducting portion;
the second transistor is electrically connected to the second end terminal via a second conducting portion; and
the power electronics device further includes:
  a first electrical path extending from the first transistor, via the first conducting portion, the first end terminal, and the first winding portion, to the tap terminal; and
  a second electrical path extending from the second transistor, via the second conducting portion, the second end terminal, and the second winding portion, to the tap terminal; wherein
  lengths of the first and second electrical paths are equal or substantially equal.

6. The power electronics device of claim 1, wherein
the first end terminal is located at a first angular position around the outer periphery of the cavity;
the second end terminal is located at a second angular position around the outer periphery of the cavity; and the tap terminal is located at an angular position between the first and second angular positions.

7. The power electronics device of claim 1, wherein
the first end terminal is located at a first angular position around the outer periphery of the cavity;
the tap terminal is located at a second angular position around the outer periphery of the cavity; and
the second end terminal is located at an angular position between the first and second angular positions.

8. The power electronics device of claim 1, wherein one of the first and second electrical windings of the embedded transformer has fewer turns than the other one of the first and second electrical windings, and the upper and lower conductive traces of the one of the first and second electrical windings are wider than the upper and lower conductive traces of the other of the first and second electrical windings.

9. The power electronics device of claim 1, further comprising:
an additional tap terminal located on the second electrical winding and including:
a third winding portion between a first end terminal of the second electrical winding and the tap terminal; and
a fourth winding portion between a second end terminal of the second electrical winding and the tap terminal.

10. The power electronics device of claim 9, wherein at least one of turns of the third winding portion is interleaved between turns of the fourth winding portion.

11. The power electronics device of claim 10, wherein all of the turns of the third winding portion are interleaved with the turns of the fourth winding portion.

12. The power electronics device of claim 9, wherein the third winding portion includes a same number of turns as the fourth winding portion.

13. The power electronics device of claim 9, wherein the additional tap terminal is located on an electrical path that is equidistant or substantially equidistant from each of the first end terminal of the second electrical winding and the second end terminal of the second electrical winding.

14. The power electronics device of claim 1, wherein
the embedded transformer includes an auxiliary electrical winding operable to switch at least one of the first and second transistors;
the auxiliary electrical winding passes through the insulating substrate and disposed around the magnetic core; and
the auxiliary electrical winding includes:
upper conductive traces disposed on the first side of the insulating substrate;
lower conductive traces disposed on the second side of the insulating substrate;
inner conductive connectors passing through the insulating substrate adjacent the inner periphery of the magnetic core, the inner conductive connectors respectively defining electrical connections between respective ones of the upper conductive traces of the auxiliary electrical winding and respective ones of the lower conductive traces of the auxiliary electrical winding; and
outer conductive connectors passing through the insulating substrate adjacent the outer periphery of the magnetic core, the outer conductive connectors respectively defining electrical connections between ones of the respective upper conductive traces of the auxiliary electrical winding and respective ones of the lower conductive traces of the auxiliary electrical winding; wherein
the upper and lower conductive traces and inner and outer conductive connectors define respective turns of the auxiliary electrical winding.

15. The power electronics device of claim 1, wherein the first and second transistors are positioned such that heat flow from the first and second electrical windings of the embedded transformer to the first transistor is equal or substantially equal to that from the first and second electrical windings of the embedded transformer to the second transistor.

16. The power electronics device of claim 1, wherein the first and second transistors are positioned such that leakage inductance between the first transistor and the first and second electrical windings of the embedded transformer is equal or substantially equal to that between the second transistor and the first and second electrical windings of the embedded transformer.

17. A push-pull power transformer comprising the power electronics device of claim 1.

18. The power transformer of claim 17, further comprising a Royer circuit on an input side.

19. The power transformer of claim 17, further comprising a synchronized rectifier on an output side.

\* \* \* \* \*